US010150935B2

(12) United States Patent
Kirihara

(10) Patent No.: US 10,150,935 B2
(45) Date of Patent: Dec. 11, 2018

(54) BREAKFAST CEREAL WITH NON-ALLERGENIC NATURAL NUT FLAVOR AND METHODS OF PREPARATION

(75) Inventor: Terry T. Kirihara, Bloomington, MN (US)

(73) Assignee: General Mills, Inc., Minneapolis, MN (US)

(*) Notice: Subject to any disclaimer, the term of this patent is extended or adjusted under 35 U.S.C. 154(b) by 985 days.

(21) Appl. No.: 12/446,610

(22) PCT Filed: Dec. 14, 2007

(86) PCT No.: PCT/US2007/087578
§ 371 (c)(1),
(2), (4) Date: Oct. 12, 2009

(87) PCT Pub. No.: WO2008/076884
PCT Pub. Date: Jun. 26, 2008

(65) Prior Publication Data
US 2010/0104698 A1   Apr. 29, 2010

Related U.S. Application Data

(60) Provisional application No. 60/870,216, filed on Dec. 15, 2006.

(51) Int. Cl.
| | |
|---|---|
| A23L 7/122 | (2016.01) |
| C11B 9/02 | (2006.01) |
| A23L 7/126 | (2016.01) |
| A23L 7/135 | (2016.01) |
| A23L 27/10 | (2016.01) |
| A23L 27/12 | (2016.01) |

(52) U.S. Cl.
CPC .............. *C11B 9/025* (2013.01); *A23L 7/126* (2016.08); *A23L 7/135* (2016.08); *A23L 27/11* (2016.08); *A23L 27/115* (2016.08); *A23L 27/12* (2016.08); *C11B 9/027* (2013.01); *A23V 2002/00* (2013.01)

(58) Field of Classification Search
CPC .......... A23L 7/122; A23L 1/164; A23L 1/221; A23L 1/222; A23L 1/28
See application file for complete search history.

(56) References Cited

U.S. PATENT DOCUMENTS

| | | | | |
|---|---|---|---|---|
| 3,717,472 | A * | 2/1973 | Strobel | 426/594 |
| 4,608,263 | A * | 8/1986 | Bergin et al. | 426/303 |
| 4,661,363 | A | 4/1987 | Gannis | |
| 6,592,915 | B1 | 7/2003 | Froseth et al. | |
| 6,676,982 | B2 * | 1/2004 | Mody | 426/93 |
| 2002/0071890 | A1 * | 6/2002 | Budwig et al. | 426/386 |
| 2005/0153044 | A1 * | 7/2005 | Hellweg et al. | 426/549 |

FOREIGN PATENT DOCUMENTS

GB   2418128 A   3/2006

OTHER PUBLICATIONS

Methods of Extracting Essential Oils: Nature's Gift Aromatherapy Products. [Online]. Apr. 17, 2003. Retrieved using Internet WayBack Machine. Downloaded at: <URL:http://web.archive.org/web/20030417162302/http:/www.naturesgift.com/extraction.htm>. 3 pages.*
Gas Chromatography Basics. [Online]. 2003. Downloaded from <URL:http://web.archive.org/web/20030519092534/http://www.ux1.eiu.edu/~cfjpb/teaching/ia/iaprojects/gc.htm> 2 pgs.*
Angel's Essence. A Guide to Using Essential Oils and Recommended Reading. [Online]. 2004. Downloaded from <URL:http://web.archive.org/web/20040411023314/http://www.angelsessence.net/usingess.htm> 5 pgs.*
Minor Oil Crops—Individual Monographs. FAO. [Online]. 2004. Downloaded from <URL:http://web.archive.org/web/20040713082552/http:/www.fao.org/docrep/X5043E/x5043E0d.htm> 10 pgs.*
Pure Almond Extract. Spice Barn. Aug. 2005. [Online]. Downloaded from <URL:http://web.archive.org/web/20050829074611/http://www.spicebarn.com/almond_extract,_pure.htm> 1 pg.*
Standards for Flavoring Extracts. 1953. [Online]. Downloaded from <URL: http://codes.ohio.gov/orc/3715.07> 2 pgs.*
Report/Connecticut Agricultural Experiment Station, vols. 16-17, 1920, p. 496.*
Burdock, George, Encyclopedia of Food and Color Additives, vol. 1, A-E, 1997, CRC Press, Inc. 1997, pp. 103-105.*
answer.yahoo.com Sep. 4, 2006 https://answers.yahoo.com/question/index?qid=20060904115141AAdWG7G.*
Raindrop Messenger Archive, Jan.-Feb. 2006, vol. 4, No. 1 www.raindroptraining.com/messenger/v4n1.html.*
Wolke, Robert, "Oils vs. Extracts" Jan. 18, 2006 http://www.washingtonpost.com/wp-dyn/content/article/2006/01/17/AR2006011700260.html retrieved on Nov. 9, 2017.*
Reineccius, Gary "Flavor Chemistry and Technology" Second Edition, 2005, Taylor & Francis Group, L.L.C. pp. 398.*

* cited by examiner

*Primary Examiner* — Hong T Yoo
(74) *Attorney, Agent, or Firm* — Diederiks & Whitelaw, PLC; Gregory P. Kaihoi, Esq.

(57) ABSTRACT

Non-allergenic natural nut essential oil are derived from natural nut materials having 100 ppb or less protein such as nut butters by steam distillation or solvent extraction. The essential nut oils are preferably dissolved in a liquid edible carrier for use as nut flavor ingredients for food products. The food products flavored with such low protein essential nut oils are hypo allergenic. Methods of preparing the nut essential oils as well as methods of preparing nut flavored food products are disclosed.

14 Claims, No Drawings

BREAKFAST CEREAL WITH NON-ALLERGENIC NATURAL NUT FLAVOR AND METHODS OF PREPARATION

CROSS-REFERENCES TO RELATED APPLICATIONS

This application is a U.S. National Stage of International Application No. PCT/US2007/087578 filed Dec. 14, 2007, which claims the benefit of U.S. Provisional Application No. 60/870,218 filed Dec. 15, 2006, the entire disclosure of his these applications are incorporated herein by reference.

FIELD OF THE INVENTION

The present invention relates to food products and to their methods of preparation. More particularly, the present invention relates to essential oils for flavor ingredients derived from nuts and legumes by steam distillation from nut butters.

BACKGROUND OF THE INVENTION

A widely popular breakfast or Ready-to-Eat puffed cereal product is marketed that comprises a cereal base in the form of puffed rings fabricated from a cooked oat dough from oat flour. The puffed ring cereal base pieces additionally include a pre-sweetener sugar coating. The cooked cereal dough and/or sugar coating importantly includes a characterizing nut flavor provided by a honey roasted almond nut butter ingredient.

While adding desirable taste and nutrition appeal to such products, almond nut butter is an expensive ingredient typically costing up to 5-20 times the cost of the oat flour and other ingredients. When added at levels of 1% up to 10% of the breakfast cereal, the cost of this one minor (in terms of weight) ingredient can be in the range of the total cost for all the other cereal ingredients combined.

Moreover, these products contain a natural nut (almond) ingredient. While only a small percentage of consumers are allergic to nuts, especially peanuts, allergies to tree nuts, including almonds, (and peanuts) are among the most worrisome since allergic reactions to these allergens can be the most severe and potentially life threatening.

As a result, consumer food product manufactures must carefully and conspicuously label any food products containing such potential allergen containing food products to alert consumers sensitive to such materials. Also, responsible commercial manufacturers undertake rigorous (and thus expensive) precautions against inadvertent contamination of any other food products with such potential allergens. For example, commercial food processing equipment used to prepare products containing a nut ingredient must undergo intensive cleaning to insure removal of any possible potential nut based allergenic contaminant. Changeovers from producing such nut ingredient bearing products to non-nut ingredient bearing products are lengthy and challenging and result in substantial loss of production due to such hygiene considerations. Consequently, production of such nut ingredient bearing products is often practiced at separate or isolated production facilities often dedicated solely to such products. The necessity for such separation and isolation adds to the cost of production of such products well above and beyond the substantial cost of these high priced nut ingredients.

Accordingly, it would be desirable to provide a nut flavored RTE cereal, or other consumer food product, that is substantially free of nut allergens, i.e., is non-allergenic.

Two traditional approaches have been taken to providing such non-allergenic nut flavor. In the first approach, a non-natural or artificial nut flavor can be used in substitution for the natural nut butter flavor ingredient. While useful, such artificial flavor ingredients usually contain only one or two principle flavor chemicals and thus lack the rich, complex, rounded flavor of a natural flavor ingredient. Also, present consumer interest trends favor the use or organic or at least "all-natural" food products (at least for some consumer product food brands). The use of such artificial flavors is inconsistent with the "all-natural" promise of such consumer brands.

In the second approach, an almond flavor derived from apricot pit extracts is used as a flavor that is thought by some to mimic the almond flavor from real almonds. Since the "almond" flavor does not actually originate from almonds, the potential for allergen contamination is absent. However, some consumers when reading the ingredient listing for food products find such substitution to be "dishonest" or misleading. Also, some more discriminating consumers are able, or believe themselves able, to distinguish the taste of such substitutes from real almond flavors.

In view of the current state of the art, there is a need for non-allergenic natural almond flavors that are derived from real almonds and to food products, especially breakfast cereal consumer food products, that are flavored with or by such non-allergenic natural almond flavors.

There is also a need for natural non-allergenic almond flavors of reduced cost relative to almond nut butters.

There is also a need for ingredients and methods of producing almond flavored cereal products not artificially flavored or flavored with ersatz almond flavorings that can be prepared on commercial production equipment that does not require expensive and extensive cleaning to reduce potential nut allergen contamination.

Surprisingly, the above needs can be satisfied and new and useful breakfast cereal products provided that are flavored by an natural yet non-allergenic almond flavor. The almond nut flavor is characterized by a protein level of less than 100 ppb (parts per billion)

BRIEF SUMMARY OF THE INVENTION

In its principle product aspect, the present invention comprises a distilled or solvent extracted natural nut essential oil derived having 100 ppb or less protein dissolved in a liquid edible carrier.

In another product aspect of one and the same invention, the present invention resides in food products, especially breakfast cereals, comprising flavoring amounts of the low protein natural nut flavor oil.

In its principle method of preparation aspect, the present invention provides methods of preparing a natural nut essential oil having a protein content of 100 ppb or less.

DETAILED DESCRIPTION OF THE INVENTION

The present invention provides natural nut essential oil derived having 100 ppb or less protein dissolved in a liquid edible carrier, to food products flavored with such low protein essential nut oils as well as to methods of preparing such products. Each of these products as well as product properties, preparation and use are described in detail below.

Throughout the specification and claims, percentages are by weight and temperatures in degrees Centigrade unless otherwise indicated. Each of the referenced patents is incorporated herein by reference.

In one embodiment of the present invention, a genuine (i.e., nut derived not from non-authentic source such as apricot pit extract or other phony source) natural (i.e., not chemically synthesized) essential oil is provided that is essentially free of any protein based nut allergens. By "essentially free" herein is meant that the protein level is below measurable thresholds of 100 parts per billion ("ppb") or less.

The present nut essential oils are natural in that they are derived from nuts from agricultural sources themselves and are not prepared by chemical synthesis. Moreover, the present nut essential oils are derived from the nut sources themselves rather than other sources that provide phony flavors that are merely reminiscent or merely mimic the flavors such as some "almond" flavors derived from apricot pit extracts. Also, the present essential oils are obtained from the nuts of the nut trees and not from other parts of the plant source (e.g., leaf, bark, root, flower or other plant part).

The present essential oils can be derived from any common nut source including almonds, brazil nuts, cashews, chestnuts, hazelnuts, macadamia nuts, pecans, walnuts, and mixtures thereof. The nut flavor of choice herein is almond. Also, the present essential oils can be derived from other seeds that are not properly considered to be nuts per se but which are popularly considered to be nuts such as peanuts, pumpkin seed, sesame seed, soybeans, sunflower, and mixtures thereof, especially peanuts. Also, while nuts obtained by conventional agricultural mass production are specifically envisioned herein, nuts obtained employing organic farming techniques to provide organic essential nut oils are also contemplated herein.

The term "essential oil" herein is used in its commonly understood meaning of a concentrated, hydrophobic liquid containing volatile aromatic compounds from plants. It is produced by distillation or by solvent extraction from nut sources. Essential oil is also known as "volatile oil" and "ethereal oil" since it contains the volatile aromatic constituents important to flavor and aroma. It may also be referred to herein (common usage) as "oil of" the raw plant material from which it was extracted, such as "Oil of almond". The term essential is intended to indicate that the oil is the fragrant essence of the plant from which it is extracted.

The present essential oils are thus to be distinguished from common nut oils that are obtained by expression. e.g., Macadamia oil (or Macadamia nut oil). Thus, "Macadamia oil" or "Macadamia nut oil" refers merely to the non-volatile oil expressed from the nut meat of the macadamia (*Macadamia integrifolia*) tree while "Oil of Macadamia" as used herein refers to the present essential oil.

As described more fully below, such essential oils are generally derived from nut butters by either steam distillation or hexane extraction. Preferred for use herein are those essential oils provided by steam distillation which are characterized in part by the absence of any residual hexane or other extraction solvent constituent. Essential oils are used in perfumery, aromatherapy, cosmetics, incense, for flavoring food and drink, and to a lesser extent, in medicine and household cleaning products. They are valuable commodities to the fragrance and flavorant industries.

In one preferred form, the present nut derived natural essential oils are dissolved in a suitable liquid carrier such as alcohol and/or propylene glycol (E number of E1520, i.e., the European food code identifier for food additives and are usually found on food labels throughout the European Union). Generally, the essential oils comprise about 1%-50%, preferably 1-10% essential oil and the balance being liquid carrier.

The present essential oil products find particular suitability for use to provide nut flavored consumer packaged food products that are nonetheless allergen free. Nut allergy is a type of food allergy. Nut allergy is a hypersensitivity to dietary substances from tree nuts causing an overreaction of the immune system which can lead to severe physical symptoms for millions of people. Nut allergy is slightly different than peanut allergy in as much as the type of nuts that cause the allergic reactions are not the same. Peanuts are considered legumes whereas tree nuts are considered dry fruits. The symptoms of peanut allergy and nut allergy are the same, but a person with peanut allergies may not necessarily also be allergic to tree nuts, and vice versa.

The present essential oils can be used to provide an allergen free nut flavoring, especially almond flavoring, to a wide variety of consumer food products whether shelf stable such as dry products or intended for refrigerated, frozen or even fresh distribution such as wet products. These food products include, for example, various dairy products, especially yogurt and ice cream, coffee creamers, flavored sour cream and cream cheeses. Especially preferred for use herein is yogurt and various yogurt products (e.g., fresh and frozen yogurt). The present essential oils find particular suitability for use as a flavoring for breakfast cereal and related products such as granola or cereal bars. In particular, the present essential oils find particular suitability for use in connection with cooked oat flour based breakfast cereals in the form of flakes and, especially puffed "O's". Also, the present essential nut oils can be used advantageously for snack mixes, candies, confections, alcoholic beverages (e.g. flavored liquors and aperitifs) and ingredients for such products (e.g., almond flavored chocolate or compound fat coating compositions). The flavor can be used in baked goods whether in the base, e.g., cup-cakes, or as part of a coating, e.g., cup-cake frosting.

The present essential nut derived oils are intended for use primarily for as flavor ingredients for food products. However, the skilled artisan will appreciate that the present essential nut oils also find suitability for use for a variety of fragrance applications. For example, a wide variety of personal care or toiletry products (shampoos and hair conditioners, soaps, body lotions, bath salts, toothpaste, mouthwash, after shaves, antiperspirants and deodorants, perfumes, body washes, make-up, shaving creams, other cosmetic products, etc.) especially for feminine oriented product categories can include the present natural essential oils. Also, a number of non toiletry consumer products can be fabricated using the present oils as a constituent, e.g., candles, aroma beads (e.g., for plug-in air freshener or aroma therapy applications), soap-alcohol based solid air fresheners, water based air fresheners sprays, aerosol air fresher sprays, dish washing soap or detergent products, car air fresheners. A wide variety of odor masking applications employ familiar scent constituents that are used to mitigate otherwise objectionable smell or odor. While such products are not intended for ingestion and thus pose reduced risks for allergic reaction even from prior known nut based ingredients, the present nut essential oils can nonetheless be advantageously employed in a manner comparable to other fruit, flower, wood or herbal essential oils.

In a preferred form, the present products include breakfast cereals or granola or cereal bars wherein at least a portion of the flavoring is provided by the present essential nut oils. In preferred form, a breakfast cereal includes an effective amount of the essential nut oil to provide desired levels of nut flavor. In one preferred embodiment, the essential flavor oil is an ingredient of a topical coating or binder such as a sugar coating. In another, less preferred variation, at least a portion of the flavor oil is an ingredient of the cooked cereal dough from which the cereal base is fabricated. Also, in one highly preferred form, the present food products flavored with the present essential nut oils are substantially free of any other added nut ingredient whereby the food product enjoys a pleasing nut flavor but is nonetheless nut allergen free.

In one preferred form, the breakfast cereal includes a base especially one provided by a dried breakfast cereal fabricated from a cooked cereal dough and sweetener or sugar coating binder are provided in a weight ration ranging from about 100:10 to 100:150, i.e., from low coating application levels to high coating application levels. In a preferred form, the sugar coating levels at levels of about 20-33%, i.e., in a cereal base to sweetener coating range of about 100:25 to about 100:50.

In such sweetener coating, the essential oil ingredient (undiluted) can range from about 0.05% of the coating to up to about 10% of the coating depending upon such factors as the amount of flavoring desired and the amount of sweetener coating applied. In more preferred embodiments, the essential oil can comprise 0.1-2% of the coating composition. Of course, the coating can additionally include other flavors especially high potency sweeteners especially those high potency sweeteners that are stable upon extended storage in acidic high moisture conditions and are also heat stable including sucralose and potassium acetysulfame and mixtures thereof. In less preferred embodiments, In still another variation, a flavored compound fat (i.e., a sweetened fat that is normally solid at room temperature) can be provided with the present natural nut essential oil for use as an ingredient in a wide variety of food applications. For example, the compound fat can be used as an ingredient per se or as a separate phase, e.g., a filling or a coating layer, of a food product. The flavored compound fat can be used as a binder to adheres loose food particulates into a solid larger form.

In still another application, a nut flavored oil can be prepared comprising a non-nut derived oil, e.g., soybean oil, corn oil, canola oil, etc., that is flavored with the present nut essential oils. An allergenic prone consumer can thus enjoy the desired and otherwise forbidden nut flavor while nonetheless enjoyed enhanced security against the danger of developing serious allergic reactions.

The resultant finished food products enjoy a desirable nut flavor, especially almond or peanut flavor, minimal potential for provoking an allergic reaction even by those sensitive to nut allergens. Also, the food products enjoy a natural full bodied flavor rather than the "thin" flavor provided by almond flavor substitutes from apricot pit extracts. Also, the present products provide reduced potential for allergic reaction compared with equivalent products but formulated containing the ordinary nut oil obtained by expression.

The present invention further provides unexpected commercial processing advantages. In commercial practice, exhaustive cleaning regimens must be practiced after nut bearing or nut base ingredients are employed in commercial food operations in order to thoroughly eliminate any possible allergen contamination before the manufacturing equipment can be used to produce non-nut containing products. As a consequence, for many large commercial food product manufactures, separate manufacturing facilities physically separated are used to produce nut ingredient bearing products from non-nut bearing products in order to ensure that no nut allergen contamination occurs. While providing desirable food safety, such physical separation requires costly duplication of production facilities. It is an advantage of the present invention that such exhaustively thorough cleaning can be reduced since the present essential oils contain minimal if any potential allergens. Also, separate production facilities can be foregone and rapid changeover from nut flavored to non-nut flavored production can be enjoyed. Also, food product nut labeling strictures are reduced.

Still another significant unexpected advantage is a cost advantage relative to using a nut butter ingredient to provide comparable levels of flavoring. As indicated above, nut butters are expensive food ingredients that are approximately 10 times the cost of other cereal ingredients such as cereal grains and cereal flour, salt and sugars. When used at even low levels ranging from about 1-8%, the cost of adding these particular flavor ingredients can result in a doubling of the raw material costs need to provide desired levels of flavoring. The present essential oils while potentially more costly on a per weight basis than nut butters or other nut ingredients actually provide cost advantages since these essential oils can be used at significantly reduced usage levels. As described in more detail below, the by-product of processing, de-flavored nut butters, can be used in a wide variety of food application that do not require intense flavor impact and can be marketed at substantially equivalent prices as conventional nut butters. Still another benefit is that using a nut derived natural flavor allows for the uses of "nut" in the product name as long as clarifying statement is made such as "flavoring with natural nut flavor" is employed.

Broadly, in preferred methods of preparation, the present essential nut oils are prepared by extraction or, equivalently herein, recovery, of the volatile flavor and aroma constituents from agricultural nut sources especially nut butters leaving a de-flavored nut butter or nut ingredient. The present invention comprises a first step of providing a ground nut material such as nut butter or ground nuts from agricultural nut sources, whether organic or obtained through conventional agricultural practices. Generally, a nut butter is prepared by grinding or otherwise comminuting a nuts or nut pieces until a smooth nut paste is obtained. Of course, nut butters have long been prepared from peanuts, e.g., peanut butter. Also well know are pecan nut butters and almond butters. Such products are consumed fresh or are often distributed with refrigerated distribution. In the commercial preparation of shelf stable peanut butter, the peanut oil is subjected to a hydrogenation step to partially hydrogenate the peanut oil to provide the nut butter against rancidity and to provide dimensional stability at room temperature. In the present methods, preferred for use herein is a nut butter wherein the oil component or fraction has not been hydrogenated, i.e., is a non-hydrogenated nut butter. Hydrogenation is not only unnecessary for use herein but also can lead to a loss of flavor and aroma quality resulting from the hydrogenation practice.

Thereafter, the present method of preparation involves removing the flavor and aroma constituents from the nut butter. In a preferred form, such extraction is performed by steam distillation or steam stripping of the flavor constituents from the nut butter. Steam distillation is a special type of distillation (a separation process) for temperature sensitive materials like natural aromatic compounds.

Many complex organic compounds tend to decompose at sustained high temperatures. Separation by normal distillation would then not be an option, so water or steam is introduced into the distillation apparatus. By adding water or steam, the boiling point of the compounds is depressed, allowing them to evaporate at lower temperatures, preferably below the temperatures at which the deterioration of the material becomes appreciable. If the substances to be distilled are very sensitive to heat, steam distillation can also be combined with vacuum distillation. After distillation the vapors are condensed as usual, usually yielding a two-phase system of water and the organic compounds, allowing for simple mechanical separation.

Steam distillation is employed in the manufacture of essential oil of flowers, for instance, for perfumes and the skilled artisan will have little difficulty selecting particular apparatus and techniques for the commercial practicing the present steam distillation step. In this method steam is passed through the nut butter. On a small or bench top scale, for example, the raw plant material whether ground nuts or the nut butter, is put into an alembic (an old fashioned distillation apparatus consisting of two retorts bulb connected by a tube) over water and heated with external flame. As the water is heated the steam passes through the plant material, vaporizing the volatile compounds. The vapors flow through a coil where they condense back to liquid, which is then collected in the receiving bulb or vessel yielding a two phase water and organic compounds. The desirable organic compound phase is then separated as an essential nut oil herein from the aqueous phase. By virtue of the steam distillation step, less than trace amounts of any potential allergenic protein materials remain in the essential nut oil. The essential nut oils obtained and employed herein are thus characterized by less than trace amounts of nut proteins (e.g., 100 ppb or lower) and can thus be characterized as hypo allergenic or non-allergenic essential nut oils.

It will be appreciate that the treated nut material will be de-flavored. However, notwithstanding this de-flavoring, the nut material, especially the nut butter material, nonetheless retains substantial utility and value and can be used in a variety of other food applications.

In a less preferred embodiment, the nut material, especially the nut butter is treated by solvent extraction to recover the desirable volatile organic compounds that comprise the essential oil. In this embodiment, a solvent such as hexane or supercritical carbon dioxide is used to extract the oils. Extracts from hexane and other hydrophobic solvent are generally called "concretes", which are mixtures of essential oil, waxes, resins, and other lipophilic (oil soluble) plant material.

Although highly fragrant, concretes can contain large quantities of non-fragrant waxes and resins. As such, if desired, another solvent, often ethyl alcohol, which only dissolves the fragrant low-molecular weight compounds is used to extract the fragrant oil from the concrete. The alcohol is removed by a second distillation, leaving behind the absolute essential oil.

In supercritical fluid extraction, supercritical carbon dioxide is used as a solvent. This method has many benefits, including avoiding petrochemical residues in the product. It does not obtain an absolute directly. The supercritical carbon dioxide will extract both the waxes and the essential oils that make up the concrete. Subsequent processing with liquid carbon dioxide, achieved in the same extractor by merely lowering the extraction temperature, will separate the waxes from the essential oils. This lower temperature process prevents the decomposition and denaturing of compounds and provides for a superior product. When the extraction is complete, the pressure is reduced to ambient and the carbon dioxide reverts back to a gas, leaving no residue.

The non-allergenic essential nut oil however obtained can then be, an the present methods can additionally comprise the step of, admixed with a suitable liquid carrier to provided liquid non-allergenic essential nut oil flavor materials of desired concentrations. Good results are obtained when the essential nut oil comprises about 1-50%, preferably about 2-10% of the liquid flavor composition and the balance the added liquid carrier ingredient. Suitable for use herein as the liquid carrier ingredient is, for example, ethanol and/glycerol or polyglycerol (propylene glycol).

Of course, while pure nut flavors are preferred, blends of nut flavors are also contemplated. Also, while less useful herein the present essential nut oils can also be admixed with non-nut flavors e.g., vanilla or chocolate. Also, while the provision of liquid essential nut oil flavored compositions is one object of the present invention, the present essential nut oils can be adsorbed with a solid carrier (typically a starch base) to provide dry free flowing non-allergenic nut flavor materials.

The present invention additionally includes methods of flavoring food products with the present liquid non-allergenic essential nut oil flavor materials. Any number of food products can be flavored with the present non-allergenic nut flavor materials of the present invention. However, the present invention finds particular suitability for use to provide nut flavored breakfast cereals and cereal products in bar or aggregates form such as granola bars and granola. In particular, the breakfast cereals can be puffed and in a wide variety of shapes especially puffed rings or "O's" or letters. Also while a variety of common cereal ingredients (wheat, corn, barley, rice, and mixtures) can be used for the breakfast cereal products, the present invention finds particular suitability for oat based products including oatmeal, granola, granola bars and pieces as well as products prepared from oat based cooked cereal doughs including both oat flakes and puffed pieces especially puffed O's.

In one embodiment, various dry ingredients (cereals, sugars, salt, flavoring) can be combined with water and cooked to form a cooked cereal dough. The cooked cereal dough can thereafter further processed by forming and drying steps to prepare a pieces of breakfast cereal. In one variation the cooked cereal dough can include flavorings that include the present liquid non-allergenic essential nut oil flavor materials to provide a non-allergenic nut flavored cooked cereal dough. While useful, in this embodiment, the flavoring is necessarily subjected to a number of lengthy thermal processing steps (cooking, drying, etc.) that can result in loss or degradation of the added and expensive flavor ingredient.

In a more preferred embodiment, a cereal base is prepared from a dried cooked cereal dough product such as flakes, biscuits, puffed pieces, shreds or mixtures thereof having a moisture content of about 1-5%. Thereafter, a quantity of such breakfast cereal pieces are flavored by applying a topical coating that includes the present liquid non-allergenic essential nut oil flavor materials. In one variation, the topical coating is in the form of a pre-sweetener coating that includes one or more flavorings including a nut flavor provided by the present liquid non-allergenic essential nut oil flavor materials. The pre-sweetener coating is applied as a nut flavored sugar syrup (typically having a moisture content ranging from about 10-20%) as a hot liquid (50-120° C.) to form a wet sugar syrup coated cereal base. Thereafter, the excess moisture supplied by the sugar(s) syrup is removed by a finish drying step to provide a dry shelf stable sweetened nut flavored breakfast cereal product. The finished breakfast cereal product so prepared is non-allergenic notwithstanding being nut flavored by virtue of employing the present non-allergenic nut flavor materials herein. This method of preparation enjoys not only low cost (relative to providing equivalent levels of nut flavoring provided by the traditional method of flavoring provided by added nut butter ingredients) but also the advantage of being non or hypoallergenic. Still another advantage is that the same cereal base that is used to provide other flavor variations can be used to supply the cereal base in the present methods. Also, the present methods of applying the flavorings as or part of a topical coating application reduces the exposure of the flavoring to high temperatures thereby minimizing heat related flavor loss.

In one variation, the ratio of cereal base to flavored topical coating ranges from about 100:1 to 100:100. For those coatings intended to provide pre-sweetening, high ratios within the recited range are generally practiced, e.g., ranging from about 100:20 to 100:50. Conversely, when the nut flavor material is intended as the sole flavor (or principle flavor such as when combined with a supplemental flavor, e.g., vanilla), then smaller quantities of the coating material is generally employed, e.g., 100:1 to 100:20 depending in part upon the concentration of the nut essential oils in the flavoring material and the desired level of flavoring desired.

In still another variation, the flavoring material can added to a compound fat composition (i.e., a mixture of fat and sugars that is very low in moisture) or chocolate. In certain variations, the compound fat can be used as a coating or filling. In other variations, the compound fat can be used as a binder to adhere small cereal particles (e.g., oat flakes) into a larger piece (e.g., granola) or mass (e.g., granola bars). Conventional added ingredients (e.g., dried fruit pieces, candies, other cereal pieces) as well as adjuvant ingredients can be included (vitamins, flavors, minerals, nutriceuticals, micronutrients, colors).

The non-allergenic nut flavored breakfast cereal products so prepared can be packaged in conventional manner for room temperature distribution and sale.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of preparing a food product, comprising the steps of:
   Extracting volatile flavor and aroma constituents from a comminuted nut material through steam distillation to provide a de-flavored nut material fraction and a non-allergenic essential nut oil;
   Admixing 1-50%, by weight, of the non-allergenic essential nut oil with a liquid carrier to provide a liquid natural nut essential oil flavor material having a protein content of 100 ppb or less, said 1-50% essential nut oil being based on a total amount of liquid natural essential oil flavor material, wherein the liquid natural nut essential oil flavor material consists of the non-allergenic essential nut oil and the liquid carrier, and the liquid carrier is selected from the group consisting of ethanol, glycerol, propylene glycol, and mixtures thereof;
   Adding the liquid natural nut essential oil flavor material to ingredients forming a dough; and,
   Forming an edible food product base from the dough, wherein the edible food product base constitutes a breakfast cereal as the food product with the liquid natural nut essential oil flavor material incorporated into at least a portion of the breakfast cereal; and topically applying a portion of the liquid natural nut essential oil flavor material to the edible food product base.

2. The method of claim 1 wherein the admixing step includes dissolving the natural nut essential oil in the liquid edible carrier.

3. The method of claim 1 wherein the admixing step is practiced to mix 2% to 19% of the essential nut oil and a balance the liquid carrier.

4. The method of claim 1 wherein the edible food product base is a blend of individual ready-to-eat cereal pieces.

5. The method of claim 4 wherein at least a portion of the cereal pieces is provided from an expanded oat based cooked cereal dough.

6. The method of claim 1 wherein at least a portion of the comminuted nut material is almonds.

7. The method of claim 1 wherein the topically applying step includes applying at least a portion of the liquid natural nut essential oil flavor material to the edible food product base, wherein the edible food product base has been pre-sweetened.

8. The method of claim 1 wherein the ratio of edible food product base to topically applied liquid natural nut essential oil flavor material is in a range of 100:1 to 100:20.

9. The method of claim 1 further comprising a step of preparing a nut flavored sugar syrup by admixing the liquid natural nut essential oil flavor material with a pre-sweetener coating, and topically applying the nut flavored sugar syrup to the edible food product base.

10. The method of claim 1 wherein the de-flavored nut material fraction is a nut butter.

11. The method of claim 1 wherein the comminuted nut material is a nut butter suitable for consumption.

12. A food product comprising:
   food flavoring composition consisting of: 1-50% by weight of a steam distilled non-allergenic natural nut essential oil derived from agricultural nut material and having 100 ppb or less protein and a balance of liquid edible carrier, based on a total amount of food flavoring composition, said non-allergenic natural nut essential oil being dissolved in the liquid edible carrier, wherein the non-allergenic natural nut essential oil is obtained by steam distillation of the agricultural nut material in a form of a smooth nut paste of comminuted nuts or nut pieces and wherein the liquid carrier is selected from the group consisting of ethanol, glycerol, propylene glycol, and mixtures thereof; and
   the food product is a blend of individual ready-to-eat cereal pieces topically coated with the food flavoring composition and the food flavoring composition is incorporated in a portion of the food product.

13. The food product of claim 12 wherein at least a portion of the blend of individual ready-to-eat cereal pieces are presweetened.

14. A method of preparing a food product, the method comprising:
   forming a food flavoring composition consisting of: 1-50% by weight of a steam distilled non-allergenic natural nut essential oil derived from agricultural nut material and having 100 ppb or less protein and a balance of liquid edible carrier, based on a total amount of food flavoring composition, said non-allergenic natural nut essential oil being dissolved in the liquid edible carrier, wherein the non-allergenic natural nut essential oil is obtained by steam distillation of the agricultural nut material in a form of a smooth nut paste of comminuted nuts or nut pieces and wherein the liquid carrier is selected from the group consisting of ethanol, glycerol, propylene glycol, and mixtures thereof; and topically coating a blend of individual ready-to-eat cereal pieces as the food product, with the food flavoring composition and incorporating the food flavoring composition in a portion of the food product.

* * * * *